March 25, 1958 W. F. COLLINS 2,827,753
COUNTERBALANCING DRIVE MEANS FOR A RECIPROCATING CUTTER
Filed Jan. 27, 1954 2 Sheets-Sheet 1
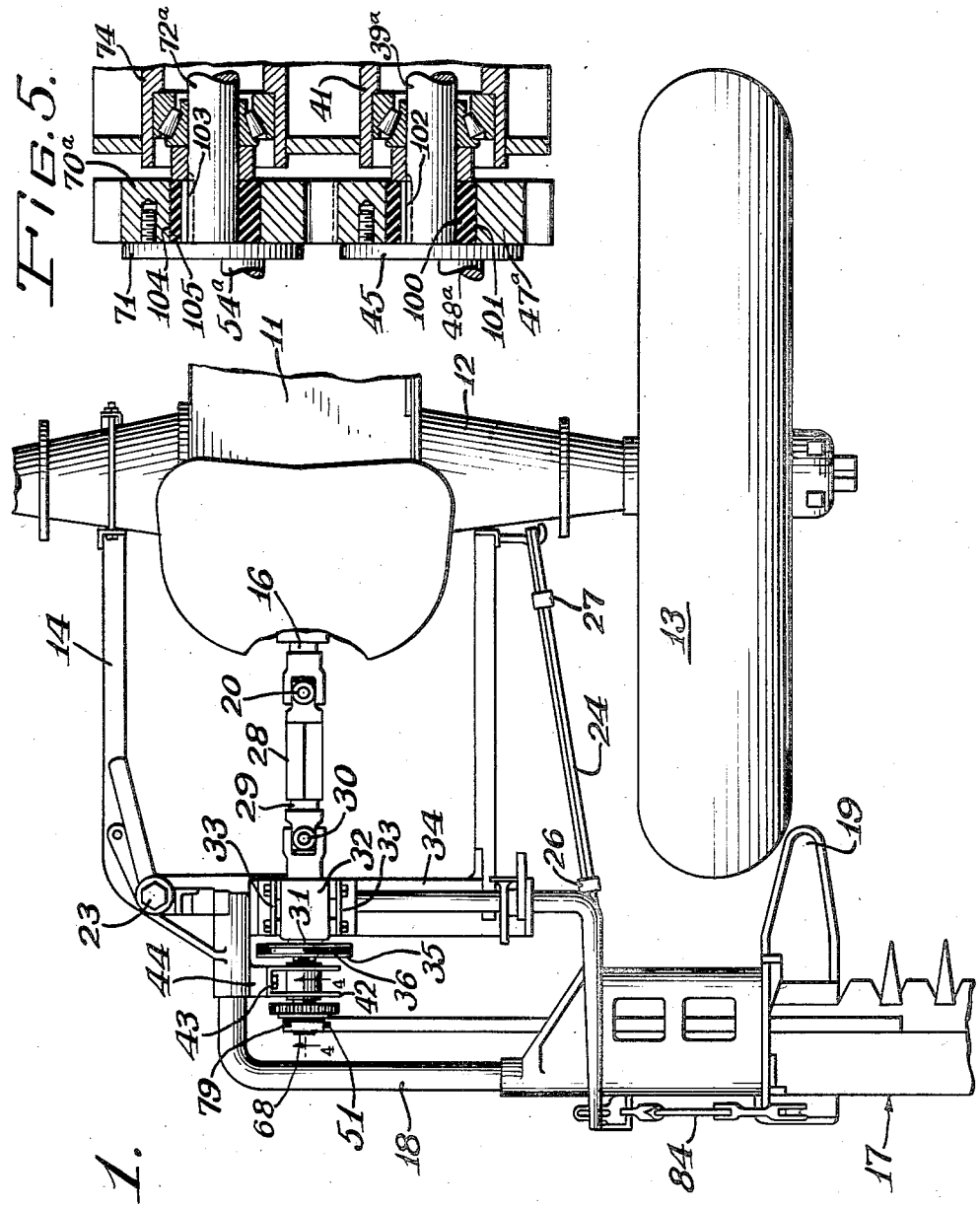
Inventor:
William F. Collins
Paul O. Pippel
Atty.

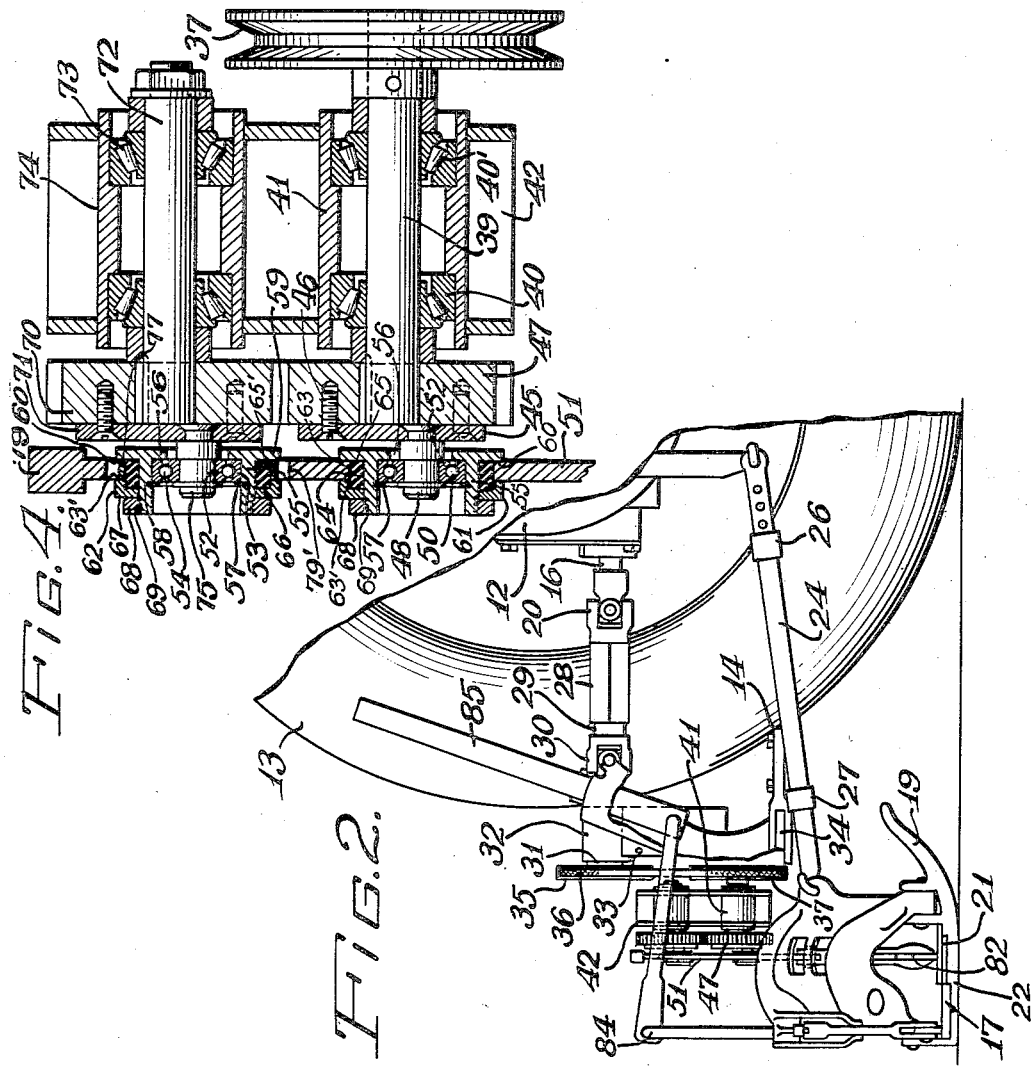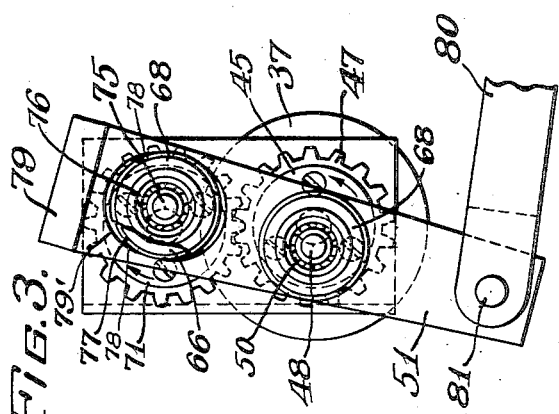

# United States Patent Office 2,827,753
Patented Mar. 25, 1958

2,827,753

COUNTERBALANCING DRIVE MEANS FOR A RECIPROCATING CUTTER

William F. Collins, Downers Grove, Ill., assignor to International Harvester Company, a corporation of New Jersey Application January 27, 1954, Serial No. 406,416

13 Claims. (Cl. 56—296)

This invention relates to mowers and more specifically to a novel drive for the sickle.

A general object of the invention is to devise a novel and improved drive for the reciprocating sickle of a mower which will obtain maximum length of stroke in line with the sickle bar and minimum length of stroke transverse to the sickle bar.

In present drives for mowers, it has been necessary to use an extremely long pitman with one end attached to the sickle and the other end journalled on a wrist pin of a flywheel and the larger flywheel had to be positioned a considerable distance off the ground in order to obtain the necessary length of stroke for reciprocating the sickle. It will be readily observed that in such an arrangement the drive actually wastes half of the rotary motion which is directed transverse to the resultant of movement of the pitman. It is the specific object of this invention to devise a drive for the mower which will obtain a maximum length of stroke along such resultant and a minimum length of stroke transverse thereto.

A further object of the invention is to provide a drive which permits reduction of the length of the pitman.

Another object is to incorporate a novel counterbalancing arrangement in the drive.

These and other objects of the invention will become more apparent from the specification and the drawings wherein:

Figure 1 is a fragmentary plan view of a tractor-mounted mower showing the invention applied thereto;

Figure 2 is an end view with parts broken away of the mower structure shown connected to the tractor taken from the grassward end thereof;

Figure 3 is an enlarged rear view of the drive with parts broken away;

Figure 4 is an enlarged cross-sectional view of the drive taken substantially on the line 4—4 of Fig. 1; and Figure 5 is a view similar to Figure 4 illustrating a modification of the invention.

As shown in the drawings, the reference numeral 11 indicates generally a chassis of an agricultural tractor with rear axle housing 12, at the outer ends of which are mounted wheels 13, and a drawbar 14 extending rearwardly of the tractor. The forward end of the tractor is not shown as it forms no part of the present invention.

The power take-off 16 in the form of a square tube extends rearwardly of the tractor chassis 11 and acts to drive a mower 17, which comprises a frame member or coupling arm 18, a shoe 19, and a sickle or cutter bar 21 adapted to reciprocate on the body portion 22 of the mower. The frame 18 of the mower 17 is hinged to the drawbar 14 at 23 about which the mower 17 may be swung rearwardly in a horizontal plane. Upon such swinging rearwardly, a telescoping connecting drag link 24 attached to the axle housing 12 and to the mower 17, extends to its limiting position, as determined by the abutment of stops 26 and 27, thereupon limiting the rearward swinging of the mower 17. Normally, this telescoping member 24 holds the mower in its operation position, that is, extending outwardly from the side of the tractor until such time that it strikes an obstruction, whereupon the telescoping member 24 is released, allowing rearward swinging of the mower to save the latter from damage.

The drive for the mower cutter bar 21 is taken from the rotary fore and aft power take-off shaft 16 through a first universal joint 20 which is joined by square telescoping shaft members 28 and 29 to a second universal joint 30. The universal joints 20 and 30 and the included telescoping square shafting 28 and 29 enable the mower to swing rearwardly and still maintain a driving engagement with the power take-off 16. The drive continues rearwardly through a first generally horizontal driving or drive shaft 31, which is journalled for rotation in a bearing 32, to a pulley 35. The bearing 32 is supported by vertically positioned brackets 33 extending upwardly from and supported on a transverse mower frame member 34 connected to the member 18 and slidably seated on the tractor drawbar 14. A V-belt 36 driven by the pulley 35 proceeds downwardly to drive a pulley 37 keyed or otherwise attached to a driven shaft 39 journalled in bearings 40 and 40′, the bearings 40, 40′ being enclosed within a sleeve 41 which is connected to a bracket member or carrier 42 which in turn is bolted, as at 43, or otherwise adapted to be secured to the adjacent portion 44 of the frame member 18 of the mower. The shaft 39 is provided with an integral connecting plate crank portion 45 which is bolted, as by bolts 46, to a spur gear 47 mounted on the shaft 39 and keyed thereto. The mounting plate 45 is connected to a wrist pin or crank 48 which is eccentrically disposed with respect to the rotational axis of the shaft 39 and with the plate forms an eccentric, the wrist pin or throw 48 being journalled within a bearing 50 which is mounted and resiliently connected to a substantially vertical driving arm 51 intermediate its ends. The bearing 50 may be of the ball-type including inner and outer races 52 and 53 with roller balls 54 therebetween and the outer race is fitted within a complementary cylindrical sleeve 55 and held therewithin through abutment at one end with an inturned flange portion 56 at one end of the sleeve and through a split ring 57 which is entered into an internal recess 58 in the internal periphery of the sleeve 55. The sleeve 55 is provided with an outturned flange portion 59 which abuts as at 60 against one side of the driving arm 51. The opposite side of the driving arm is engaged as at 63′ by an inturned annular and peripheral axially extending flange portion 62 of a clamp structure or cup-like washer 61, the said clamp structure 61 receiving therewithin one end of a resilient cylindrical-shaped bushing 63 formed of rubber or neoprene or any other suitable synthetic flexible substance. The bushing 63 is fitted complementally within an aperture 64 in the arm 51 intermediate its ends and at one end is seated as at 65 against the flange portion 59 of the sleeve 55 and its other end seats as at 66 against the radial plate portion 67 of the washer assembly 61, said plate portion 67 being sleeved over bushing 55 and being engaged on its external side by a nut 68 which is threaded as at 69 on the sleeve 55. The nut 68 is rotatable to draw up the washer assembly 61 and the sleeve with its flange portion 59 in clamping engagement with an arm 51 therebetween with attendant compression and confinement of the bushing 63 in order to provide a controlled yieldable connection between the arm and the wrist pin.

The gear 47 meshes with a companion gear 70 of exactly the same size and drives the same and defines counterdrive transmitting means therewith, the gear 70 being connected through a mounting crank plate 71 of a countershaft 72, said plate 71 being connected to the shaft 72 and formed integral therewith or weld-connected thereto, as is the plate 45 to the shaft 39. The countershaft 72 is journalled in bearings 73 and extends generally parallel to the shaft 39 and is mounted on the bearings 73 within a sleeve 74 which is connected to the bracket 42 in vertically spaced, generally parallel relationship to the driven shaft 39. The plate 71 is provided with a wrist pin or crank or eccentric or throw 75 which through a bearing assembly 76, which is substantially identical with the bearing assembly 50 previously described, the same reference characters being applied thereto, is resiliently connected to the upper end of the driving arm or lever element or pendular drive member 51. The bearing assembly 76 is provided with an outer sleeve 77 about its resilient bushing 65'. The sleeve 77 snugly fits and slides between the lateral edges 78, 78 of an oval slot 79' elongated lengthwise of the arm 51. The upper end of the arm 51 is provided with a counterweight 79 of a size which produces a force result in relation to the direction it moves of a valve substantially equal to the mass times the acceleration of the reciprocating knife and the pitman driving the same. It will be understood that the wrist pin 75 is positioned at 180° or at a straight angle out of phase to the wrist pin 48, as best seen in Figure 3 and that their length of throw is the same, and that the gears 47 and 70 rotate in counter directions, as shown by the arrows in Figure 3. The motion imparted to the arm or pendular drive member 51 is eliptical and the disposition being so as to make the major axis of the elipse the mean between the upper and lower limits of the movement of a pitman 80 which is pivoted at one end as at 81 to the lower end of the driving arm 51 and the other end is connected through a ball joint 82 to the sickle or knife blade 21. The pitman extends angularly to the arm 51.

It will be appreciated that the resilient connections between the wrist pins driving the arm 51 and the arm not only provide self-adjusting centers, but also serve in the capacity of shock absorbers to partially cushion the impact of the reciprocating knife slab at each end of its stroke.

The mower is provided with a conventional lifting linkage 84 which includes a lever 85 for disposing the mower in the desired cutting position as will be readily understood by those skilled in the art.

Figure 5 illustrates a modification wherein parts identical with those of the previous embodiment are identified by the same reference numerals. The gears 47a and 70a are provided with longer teeth than the counterpart gears 47 and 70, and the gear 47a is cushioned and movable radially on a sleeve 100 which encompasses the shaft 39a and fits in a bore 101 of gear 47a. The gear 47a is interlocked by a key 102 with shaft 39a which corresponds to shaft 39 of the previous embodiment. The gear 70a is keyed at 103 to shaft 72a, which corresponds to shaft 72, and has a bore 104 within which is positioned a sleeve 105 which is about the shaft 72a. The sleeves 105 and 101 are formed of rubber or any other suitable material such as neoprene. These rubber bushings serve to permit the gears to move toward and away from each other to accommodate the varying lengths between the cranks 48a, 54a, which are connected directly to the gears 47a and 70a, respectively.

In this embodiment, the connections between the cranks and the pendular drive member may be fixed pivots or journals.

What is claimed is:

1. In a drive of the class described for one of a pair of cooperatively arranged cutting elements, a pitman connected to said one element, a driving lever having one end pivoted to the pitman, and a pair of reversely rotating crank means drivingly connected to said lever at longitudinally spaced points disposed respectively intermediate the ends thereof and adjacent to the opposite end thereof, and said crank means driven simultaneously in opposite directions.

2. In an oscillatory drive for a reciprocal element comprising a pair of counter rotating eccentrics phase coupled together at substantially a straight angle apart, a pendular drive member straddling said eccentrics, a fixed journal connection between said member intermediate the ends thereof and one of said eccentrics and a slidable journal connection between the other eccentric and said member adjacent to one end thereof and said member having a slot elongated lengthwise thereof and a bearing interposed between said other eccentric and said slot and rotary and reciprocal in the slot lengthwise thereof, and means pivotally connecting said member to said element at a point spaced from said connections between said member and said journal connections.

3. For a mower having a support frame, a cutter bar supported from the frame, a sickle reciprocable on the cutter bar, and sickle drive means including a driving shaft carried on the support frame and adapted for connection to the power take-off of an associated tractor and a pitman connected to the sickle, the improvement comprising: a carrier adapted for mounting upon said frame proximate to said driving shaft, a driven shaft and a countershaft rotatably supported from said carrier generally parallel to said driving shaft, means drivingly connecting said driving shaft with said driven shaft, said driven shaft and countershaft spaced vertically, means drivingly interconnecting said driven shaft with said countershaft for rotating the latter in a reverse direction as respects to the former, cranks operatively connected with said driven shaft and countershaft, respectively, and constrained for rotation therewith and spaced 180° apart, a substantially vertically disposed pendular drive member having driving connections at vertically spaced points with respective cranks and having a lower end drivingly connected to said pitman.

4. The combination according to claim 3, and said pendular drive member having an upper end, and a counterweight carried on said upper end and formed and arranged to counterbalance said sickle and pitman.

5. The combination according to claim 3 and said means drivingly interconnecting said driven shaft with said countershaft comprising a pair of meshing gears keyed to the respective shafts, means resiliently mounting said gears on the respective shafts to permit some movement of said gears radially with respect thereto and to each other, and said cranks directly mounted on said gears.

6. For a mower having a support and a cutter bar carried thereon and including a pitman driven sickle reciprocable on the cutter bar and sickle drive means including a first shaft rotatably mounted upon the support at an elevation for alignment and connection at one end to the power take-off of an associated tractor, the improvement comprising: a carrier adapted for mounting upon said support proximate to the other end of said first shaft; second and third shafts journalled on the carrier and spaced vertically relative to one another on axes generally parallel to said first shaft, means drivingly interconnecting said second and third shafts for rotation in opposite directions, crank means connected to said second and third shafts, a vertical lever drivingly connected at longitudinally spaced points to the respective crank means and operatively connected at its lower end to the pitman.

7. For use with a mower described in its operating position of the type including a tractor-mountable support and a cutter bar including a sickle reciprocable thereon and carried from the support generally parallel to the ground and means for reciprocating the sickle comprising a pitman connected at one end to said sickle and extending lengthwise of the sickle angularly upwardly and outwardly therefrom towards its opposite end in vertically spaced relation to the ground, the improvement comprising: means for driving said pitman including an upright pendular element having a lower end pivoted to said opposite end of said pitman, a carrier mounted on said support, a pair of fore and aft extending vertically spaced shafts journalled on the carrier, meshing gear means connected to respective shafts and formed and arranged to rotationally drive said shafts in reverse directions, crank means operatively associated with the respective shafts and constrained for rotation therewith, each crank means having a throw circumferentially displaced substantially 180° from the throw of the other crank means, means drivingly connecting said crank means to said pendular member at vertically spaced points, and drive transmitting means connected to one of said shafts and having means for connection with the power take-off of an associated tractor.

8. The invention according to claim 7 and cushioning means mounting said gears on the respective shafts for yieldable movement radially as respects to said shafts and to each other.

9. The invention according to claim 7 and further characterized in that said means drivingly connecting said throws with said pendular member are yieldable and resilient.

10. The invention according to claim 7 and said means drivingly connecting one of said throws with said pendular member comprising a fixed rotatable connection between said one of said crank means and said member and solely supporting said member, and the means drivingly connecting the other of said crank means with said member comprising a rotatable connection having a slidable mounting on said member for movement upwardly and downwardly lengthwise thereof.

11. In a device of the class described for driving a reciprocal element, a driving lever, means operatively connecting one end of said lever to said element, a pair of counter-rotationally driven crank means drivingly connected to said lever at spaced points and a counterweight connected to the other end of said lever.

12. The invention according to claim 11 and at least one of said crank means having a fixed rotary connection with said lever.

13. The invention according to claim 11 and meshing gear means connected to respective crank means, and rubber-like means resiliently mounting said gear means together with said crank means to accommodate relative movement between said gear means and said crank means radially toward and away from each other.

References Cited in the file of this patent

UNITED STATES PATENTS

| | | |
|---|---|---|
| Re. 21,819 | Korsmo et al. | June 3, 1941 |
| 622,827 | Smith | Apr. 11, 1899 |
| 1,512,956 | Thomas et al. | Oct. 28, 1924 |
| 1,627,711 | Pearson | May 10, 1927 |
| 1,804,577 | Walter | May 12, 1931 |
| 1,947,552 | Huddle | Feb. 20, 1934 |
| 1,977,429 | Crumb et al. | Oct. 16, 1934 |
| 2,431,493 | McIlrath | Nov. 25, 1947 |
| 2,580,266 | Abgarian | Dec. 25, 1951 |